(No Model.)
E. PECKHAM.
CAR WHEEL.
No. 375,092. Patented Dec. 20, 1887.
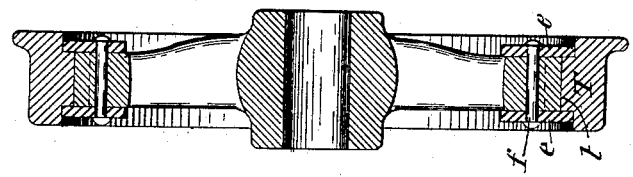
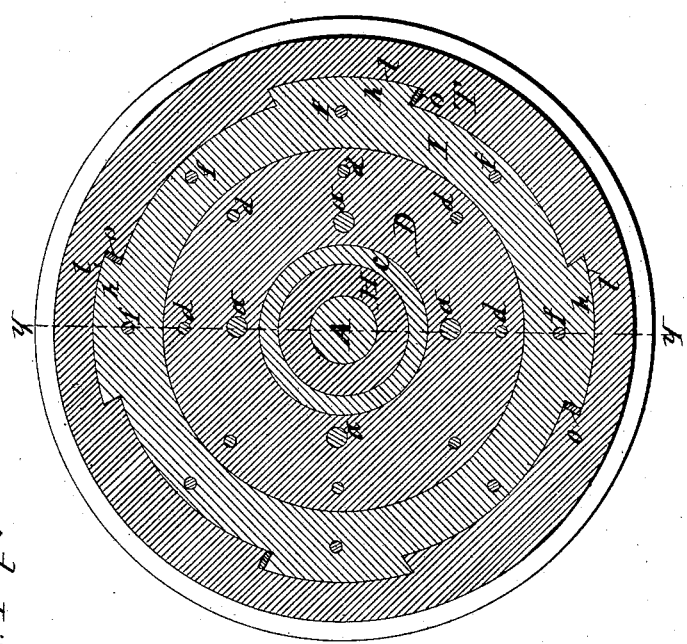
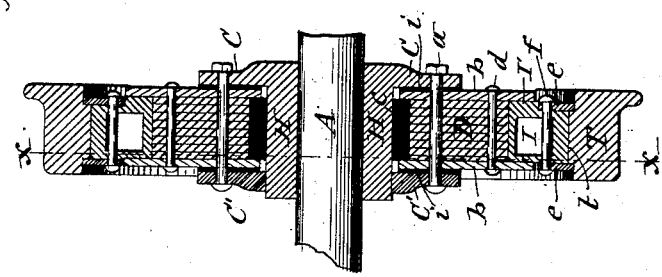
WITNESSES:
C. Bendixon
C. E. Tomlinson
INVENTOR
Edgar Peckham
BY
Dudley, Laass & Hull
ATTORNEYS

UNITED STATES PATENT OFFICE.

EDGAR PECKHAM, OF SYRACUSE, NEW YORK, ASSIGNOR TO THE PECKHAM CAR WHEEL COMPANY, OF SAME PLACE.

CAR-WHEEL.

SPECIFICATION forming part of Letters Patent No. 375,092, dated December 20, 1887.

Application filed March 23, 1887. Serial No. 232,056. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention consists, first, in improved means for rigidly securing the tire to the body of the car-wheel irrespective of the material of which the body is composed, and, secondly, in an improved construction of a car-wheel body composed partly of paper, by which latter improvement I obtain greater bearing-surfaces for the paper core of the wheel-body, and thus enable the said core to better endure the strain it is subjected to, all as hereinafter more fully described, and specifically set forth in the claims.

In the accompanying drawings, Figure 1 is a transverse section taken on line $y\,y$, Fig. 2. Fig. 2 is a sectional view taken on line $x\,x$, Fig. 1. Fig. 3 is a transverse section of a cast-iron wheel-body with steel tire embodying my improved tire-fastening devices, and Fig. 4 is a side view of a portion of the tire which is provided with a groove by which it is locked on the wheel-body.

Similar letters of reference indicate corresponding parts.

T denotes the tire, which I secure to the body of the wheel by providing the inner peripheral face of the tire with transverse grooves $l\,l$, preferably dovetailed shape, and providing the outer peripheral face of the wheel-body with tongues $h\,h$, which are inserted in the grooves $l\,l$ of the tire, and preferably tightened therein by keys $o\,o$, inserted between the ends of the grooves and tongues. Said grooves and tongues may be extended completely across the tire and outer peripheral face of the wheel-body; but, in order to reduce the cost of forming or cutting the grooves and fitting thereto the tongues of the wheel-body, I reduce the width of that portion of the inner peripheral face of the tire which is to be grooved to the same width as the outer peripheral face of the wheel-body by forming said tire with a circumferential inward projection, $t$, and forming the grooves $l\,l$ in said projection. By the aforesaid construction and combination of parts I effectually prevent the tire from slipping circumferentially on the wheel-body.

In order to prevent lateral displacement of the tire on the wheel-body, I clamp on opposite sides of said body retaining-rings $e\,e$, secured to the body by bolts $f\,f$, passing transversely through the rings and wheel-body, said rings lapping onto opposite sides of the projection $t$ of the tire.

When the aforesaid tire-fastening devices are to be applied to a wheel-body having a paper or non-metallic core, I form said body of a metallic ring, I, the outer peripheral portion of which is of the same width and of the same diameter as the inward projection, $t$, of the tire T. The inner peripheral portion of the aforesaid ring is formed with a lateral enlargement, preferably toward the inner face of the wheel, as illustrated in Fig. 1 of the drawings. By said enlargement I obtain greater bearing-surface for the paper core D, which is secured between two web-plates, $b\,b$, clamped on opposite sides of said core by bolts or rivets $d\,d$, passing transversely through the plates and intervening paper core, said web-plates embracing opposite sides of the enlarged portion I' of the ring I. The aforesaid web-plates with the paper core are secured to the hub H, which is provided with a rigid collar, C, and a loose collar, C', which embrace opposite sides of the web-plates $b\,b$, and are made to firmly hold the same on the hub by bolts or rivets $a$, passing transversely through the aforesaid collars and intervening web-plates and paper core.

In order to protect the paper or non-metallic core D from wear and abrasion around its central eye or axial bearing, I interpose between the eye of said non-metallic core and the hub H an annular cushion, $c$, composed of either vulcanized fiber or combined hemp and rubber or other analogous material, as illustrated in Fig. 1 of the drawings. I do not, however, confine myself to the use of the aforesaid cushion only at the point aforesaid, as the same may be also used between the joints of any car-wheel composed of concentric annular members, for the purpose of preventing the jar and crystallization of the metal of which the wheel is composed. For this same purpose, I also interpose non-metallic linings $i\,i$ between the sides of the web-plates and collars C C'.

Having described my invention, what I claim as new, and desire to secure by Letters Patent, is—

1. In a car-wheel, the combination of a hub, web-plates detachably secured to said hub, a non-metallic core between said plates, and an annular cushion of vulcanized fiber interposed between the hub and non-metallic core, substantially as described and shown.

2. The combination of the tire provided with transverse grooves in its inner peripheral face, the wheel-body provided on its outer peripheral face with tongues inserted in said grooves, keys inserted between the ends of the grooves and tongues, and retaining-rings clamped removably on opposite sides of the body and lapping onto the sides of the tire and ends of the keys, substantially as described and shown.

3. In combination with the hub and tire, a metallic ring secured to the inner peripheral face of the tire and formed with a circumferential lateral enlargement adjacent to its inner periphery, web-plates secured to opposite sides of the enlarged portion of the aforesaid ring and to the hub, and a non-metallic core between said web-plates, substantially as described and shown.

4. In combination with the hub and the tire, which latter is provided with a circumferential inward projection on its inner peripheral face, a metallic ring having its outer peripheral face of the same width and same diameter as the aforesaid projection of the tire, and the inner peripheral portion of the aforesaid ring enlarged in width toward the inner side of the wheel, retaining-rings secured to opposite sides of the outer peripheral portion of the said ring and embracing the aforesaid inward projection of the tire, web-plates secured to opposite sides of the enlarged portion of the ring and to the hub, and a non-metallic core between said web-plates, substantially as described and shown.

5. In combination with the hub having a rigid collar and a detachable collar, web-plates with a non-metallic core between them clamped between the aforesaid collars, and non-metallic linings interposed between the sides of the web-plates and collars, substantially as described and shown.

6. A car-wheel composed of a hub having a rigid collar and a detachable collar, a tire formed with an inward projection on its inner peripheral face and with transverse grooves in said projection, a metallic ring seated against the inner face of said projection and provided with tongues inserted in the aforesaid grooves and formed with a lateral enlargement adjacent to its inner periphery, retaining-rings clamped on opposite sides of the outer portion of the tongued ring and lapping over the sides of the tire, web-plates embracing the inner portion of the tongued ring and clamped between the two collars of the hub, and a non-metallic core between the web-plates, substantially as described and shown.

In testimony whereof I have hereunto signed my name and affixed my seal, in the presence of two attesting witnesses, at Syracuse, in the county of Onondaga, in the State of New York, this 19th day of March, 1887.

EDGAR PECKHAM. [L. S.]

Witnesses:
H. P. DENISON,
N. M. SEAMANS.